(12) United States Patent
Lee

(10) Patent No.: US 10,914,630 B2
(45) Date of Patent: Feb. 9, 2021

(54) METHOD FOR DETERMINING CONTRIBUTION AND ORIENTATION OF LIGHT SOURCES AT A PREDETERMINED MEASUREMENT POINT

(71) Applicant: SIGNIFY HOLDING B.V., Eindhoven (NL)

(72) Inventor: Wei Pein Lee, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/081,078

(22) PCT Filed: Feb. 21, 2017

(86) PCT No.: PCT/EP2017/053928
§ 371 (c)(1),
(2) Date: Aug. 30, 2018

(87) PCT Pub. No.: WO2017/148745
PCT Pub. Date: Sep. 8, 2017

(65) Prior Publication Data
US 2019/0011312 A1    Jan. 10, 2019

Related U.S. Application Data

(60) Provisional application No. 62/302,533, filed on Mar. 2, 2016.

(30) Foreign Application Priority Data

Apr. 15, 2016   (EP) .................................... 16165475

(51) Int. Cl.
*G01J 1/44*    (2006.01)
*H05B 47/11*   (2020.01)
(Continued)

(52) U.S. Cl.
CPC .............. *G01J 1/44* (2013.01); *G06K 9/4661* (2013.01); *G06T 7/70* (2017.01); *G06T 7/73* (2017.01);
(Continued)

(58) Field of Classification Search
None
See application file for complete search history.

(56) References Cited

U.S. PATENT DOCUMENTS

| 9,113,514 B2 | 8/2015 | Wang et al. |
| 2014/0015775 A1 | 1/2014 | Wu et al. |

(Continued)

FOREIGN PATENT DOCUMENTS

| EP | 2857934 A1 | 4/2015 |
| EP | 2928269 A1 | 10/2015 |

(Continued)

OTHER PUBLICATIONS

Wuller et al., "The usage of digital cameras as luminance meters", SPIE-IS&T, vol. 6502, pp. 65020U-1-65020U-11, 2007. (Year : 2007).*

(Continued)

*Primary Examiner* — Hung Q Dang
(74) *Attorney, Agent, or Firm* — Meenakshy Chakravorty

(57) ABSTRACT

A method (300) for determining contribution of light sources (103) at a first predetermined measurement point (121), the method comprising the steps of: positioning (310) a light sensor (129) of a sensor unit (117) comprising a matrix of light sub-sensors (130) at the first measurement point, and orienting the light sensor toward the light sources; setting (320) an exposure level or a gain level of the sensor unit at a level sufficient to form a digital image wherein each of the majority of light sources within a field of view of the light sensor are distinguishable; taking (320) a digital image (420) by the sensor unit of the light sources; identifying (330) each pixel or pixel group (P) of the digital image that represent each light source of the majority of light sources; and determining (340) pixel values of each pixel or group pixel group of the digital image that represent each light source.

6 Claims, 7 Drawing Sheets

(51) Int. Cl.
   *G06T 7/70*    (2017.01)
   *G06T 7/73*    (2017.01)
   *G06K 9/46*    (2006.01)
   *H04N 5/235*   (2006.01)
   *H04N 5/243*   (2006.01)
   *G01J 1/42*    (2006.01)
   *H05B 47/125*  (2020.01)

(52) U.S. Cl.
   CPC ......... *H04N 5/2351* (2013.01); *H04N 5/2353* (2013.01); *H04N 5/243* (2013.01); *H05B 47/11* (2020.01); *G01J 2001/4247* (2013.01); *G06T 2207/30228* (2013.01); *Y02B 20/40* (2013.01)

(56) References Cited

U.S. PATENT DOCUMENTS

2014/0267774 A1    9/2014    Holz

2017/0210486 A1*   7/2017    O'Brien .................. G03B 7/30

FOREIGN PATENT DOCUMENTS

GB    2418482 A       3/2006
WO    2010041584 A1   4/2010
WO    2015128143 A1   9/2015

OTHER PUBLICATIONS

Hiscocks, "Measuring Luminance with a Digital Camera", Syscomp Electronic Design Limited, pp. 1-27, Feb. 2014, (Year: 2014).*
Helke Gabele, "Einsatz Digitaler Kameras Als Leuchtdichtemessgerate," 2006 (81 Pages).
Peter D. Hiscocks, "Measuring Luminance With a Digital Camera: Case History," 2013 (10 Pages).
Peter D. Hiscocks, "Measuring Luminance With a Digital Camera," 2014 (27 Pages).

* cited by examiner

METHOD FOR DETERMINING CONTRIBUTION AND ORIENTATION OF LIGHT SOURCES AT A PREDETERMINED MEASUREMENT POINT

CROSS-REFERENCE TO PRIOR APPLICATIONS

This application is the U.S. National Phase application under 35 U.S.C. § 371 of International Application No. PCT/EP2017/053928, filed on Feb. 21, 2017, which claims the benefit of U.S. Provisional Patent Application No. 62/302,533, filed on Mar. 2, 2016 and European Patent Application No. 16165475.1, filed on Apr. 15, 2016. These applications are hereby incorporated by reference herein.

FIELD OF THE INVENTION

The present disclosure is directed generally to methods and systems for determining the relative or actual lux value contribution and orientation of each of at least a majority of light sources in a lighting unit at a predetermined measurement point within a lighting environment.

BACKGROUND

For certain lighting projects where many products like, for example, ArenaVision floodlights are used, a light plan is first developed by a light designer. The light plan typically defines both the position and orientation of every light source in a lighting system. The goal of a lighting system design is that the lighting installation in, for example, a soccer/football stadium, complies with particular standards (e.g., standards set by an organization such as the Union of European Football Associations).

Typically, validation procedures of the lighting system after installment involve lux measurements at points in a predefined grid in the area lit by the lighting system (e.g., with an interval of about 10 meters). Such conventional procedures require multiple sensor orientation measurements to quantify both horizontal and vertical illuminations. The required orientations can differ between standards. For example, a relatively new standard requires measurements by targeting a sensor toward north, south, west, east, and up.

The limited "field of view" of a conventional 1D light sensor enables one to separately measure light received coming from certain directions. Although a user of a conventional 1D light sensor can isolate the "scope" of the measurement (e.g. north, south, west, east, and up), the conventional 1D light sensor cannot be used to determine the contribution of individual light sources of a lighting unit or system that are aimed to a predetermined measurement point. Such a sensor is particularly limited for analyzing non-uniformity of the lit area due to, e.g., an aiming error, faulty floodlight, etc. In general, measuring with different sensor orientations is performed manually and sequentially. This makes the orientation or "aiming" of the conventional sensor less exact and the procedure cumbersome. Experiments have been done with a sensor unit with 5 sensors targeting to the different directions. A user still has to make sure that the sensor unit is level (e.g. center the air bubble). However, even then there exists a freedom of rotation (like the rotation of a compass). This requirement and issue apply for every measurement on the predefined grid. Therefore, the conventional process remains less exact. Furthermore, a user should have a different sensor unit for each standard that is different or have a sensor unit that could potentially be configurable (which could require quite some mechanical development and revisions to conventional systems).

Moreover, due to the limited predefined "field of view" of a conventional 1D light sensor, such a sensor will also measure ambient light in addition to the light emanating from the individual light sources of the lighting system. The inability to avoid measuring the ambient light dictates that proper conventional measurements may only be performed at night or when there is otherwise a lack of such "noise" light.

Accordingly, there is a need in the art for methods and systems that determine the lux value contribution and orientation of each of at least a majority of light sources in a lighting unit at a predetermined measurement point within a lighting environment, where such determination is not limited by the existence of ambient light.

SUMMARY OF THE INVENTION

The present disclosure is directed to inventive methods and systems for determining the relative or actual lux value contribution and orientation of each light source of at least a majority of light sources in a lighting unit at at least one predetermined measurement point within a lighting environment. Various embodiments and implementations herein are directed to a sensor unit including a light sensor with a matrix of light sub-sensors with very narrow "fields of views" (as compared with conventional sensors described above), such as a digital camera or other similar device (e.g., smartphone), which is configured to take digital images of such a majority of light sources at the predetermined measurement point in 3D space. The sensor unit can be calibrated and configured to measure the lux values for each individual "view cone" that each pixel of a digital image represents (relative lux values based on pixel values or actual lux values via a pixel value to lux value conversion). In turn, the sensor unit can be utilized to quantify/determine the lux value contribution (relative or actual) of each light source of the majority of light sources. Since each pixel of the digital image can represent a very narrow measurement "view cone," the sensor unit can perform more isolated measurements without other influences such as ambient light (as compared with conventional sensors described above). This allows for a sensor unit of an embodiment to perform light measurements in a lighting environment during the daytime.

Generally, in one aspect, a method for determining lux value contribution of each of at least a majority of light sources of a lighting unit at a first predetermined measurement point within a lighting environment is provided, the method including the steps of: positioning a light sensor of a sensor unit comprising a matrix of light sub-sensors at the first measurement point, and orienting the light sensor toward the light sources of the lighting unit; setting an exposure level or a gain level of the sensor unit at a level sufficient to form a digital image wherein each of the majority of light sources within a field of view of the light sensor are distinguishable from other respective adjacent light sources of the lighting unit; taking a digital image by the sensor unit of the light sources of the lighting unit within the field of view of the light sensor; identifying each pixel or group of pixels of the digital image that represents each light source of the majority of light sources within the field of view of the light sensor; and determining pixel values of each pixel or group of pixels of the digital image that represents each light source of the majority of light sources within the field of view of the light sensor.

According to an embodiment, the method further includes the step of providing the light sources of the lighting unit with a predefined orientation value according to a light plan.

According to an embodiment, the step of determining further includes the step of determining the relative lux values of each pixel or group of pixels of the digital image that represent each light source of the majority of light sources within the field of view of the light sensor by comparing the pixel values of each pixel or group of pixels of the digital image that represents each light source of the majority of light sources within the field of view of the light sensor.

According to an embodiment, the step of determining further includes the step of determining the actual lux values of each pixel or group of pixels of the digital image that represent each light source of the majority of light sources within the field of view of the light sensor.

According to an embodiment, the step of determining the actual lux values includes cross referencing the pixel values of each pixel or group of pixels of the digital image that represents each light source of the majority of light sources within the field of view of the light sensor with a pixel value to lux value calibration table.

According to an embodiment, the method further includes the step of the determining an actual orientation value of a first light source of the majority of light sources within the field of view.

According to an embodiment, the method further includes the step of comparing the determined orientation value of the first light source with the predefined orientation value according to the light plan, and determining any differences between the determined orientation value and the predefined orientation value.

According to an embodiment, the step of determining the orientation further includes the step of developing a light intensity profile of the first light source by: taking a plurality of digital images of the light source with the sensor unit along multiple respective points of a predetermined path; identifying each pixel or group of pixels (P) of the digital image that represents the first light source; and determining pixel values of each pixel or group of pixels of the digital image that represents the light source.

According to an embodiment, the sensor unit is a digital camera.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting unit" is used herein to refer to an apparatus or system including one or more light sources or groups of light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "sensor unit" is used herein to refer to a device that is configured to take digital images and can include any type of digital camera or other similar device (e.g., smartphone configured to take digital images and to vary the exposure level, which relates to the amount of light captured by the sensor unit's sensor, as should be appreciated and understood by those of skill in the art in conjunction with a review of this disclosure).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network. In addition, data transmission, communication, and any control signals between the sensor unit and any other computer/processor-based devices/systems can sent and received pursuant to a wired communication or via a portable media device (e.g., flash drive or other USB storage device).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method using a sensor unit (e.g., digital camera) configured or programmed to determine the relative and actual lux value contribution and orientation of each of at least a majority of light sources of a lighting unit at a first predetermined measurement point within a lighting environment. More generally, Applicant has recognized and appreciated that it would be beneficial to provide a sensor unit with a matrix of light sub-sensors with very narrow "fields of views" (as compared with conventional sensors described above), which is structured or programmed to take a digital image of such a majority of light sources at the predetermined measurement point. As should be understood by a person of ordinary skill in the art in conjunction with a review of this disclosure, the "narrow field of view" is a consequence of the matrix sensor in that that it inherently divides the overall field of view of the camera, i.e., a physical distribution. A highly simplified model (or definition) of the fov of sub-sensor can be equated to the camera fov/number of pixels. It is highly simplified because of the respective optical distortion of the camera system. With this single digital image, it can be possible to determine the individual contribution of each of a particular group of light sources at the single predetermined measurement point. In other words, the collective contribution of the subject light sources at the predetermined measurement point can be determined.

Figure 1A:
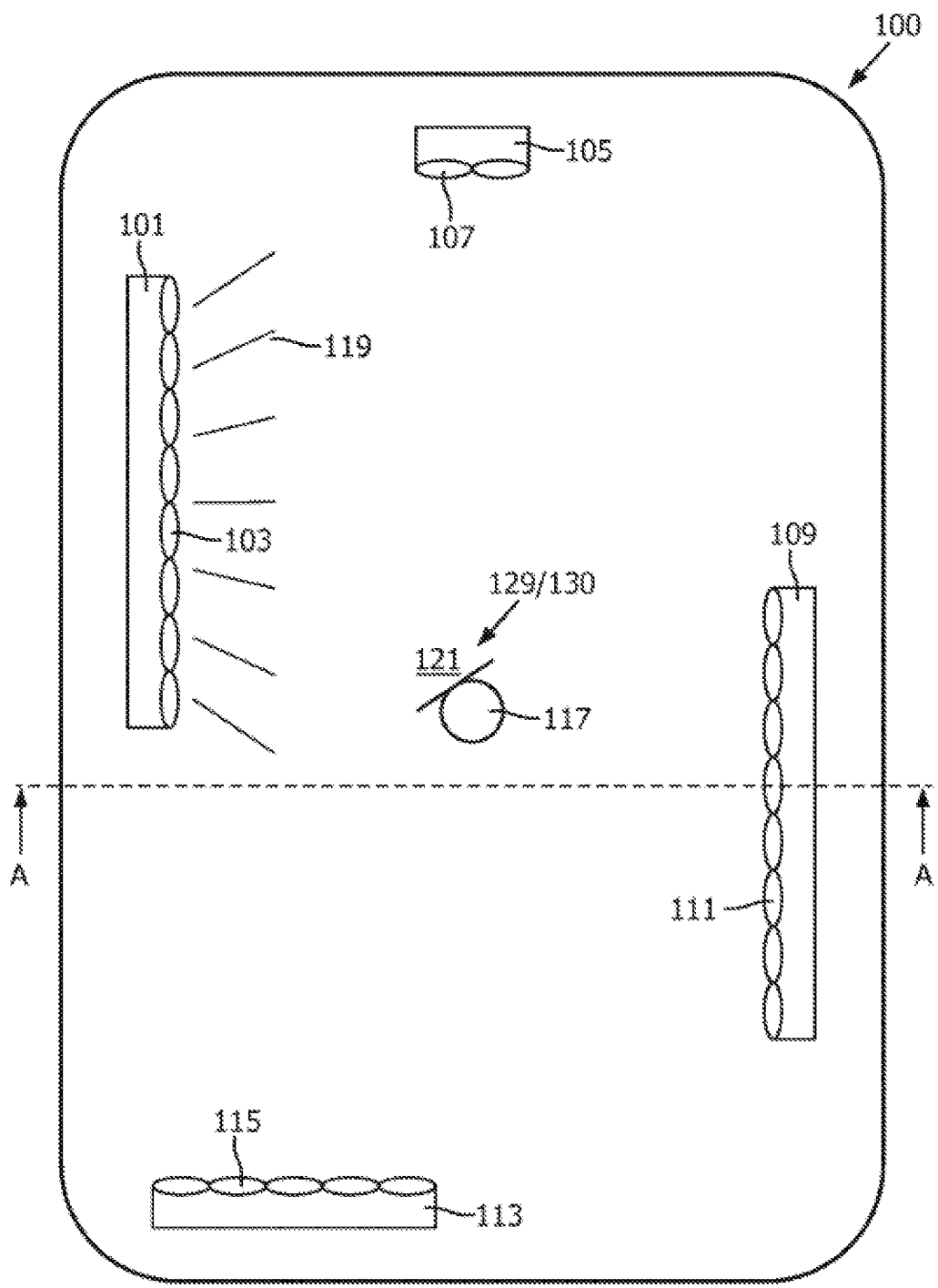
FIG. 1A is a top perspective view schematic representation of a lighting environment, in accordance with an embodiment.
Figure 1B:
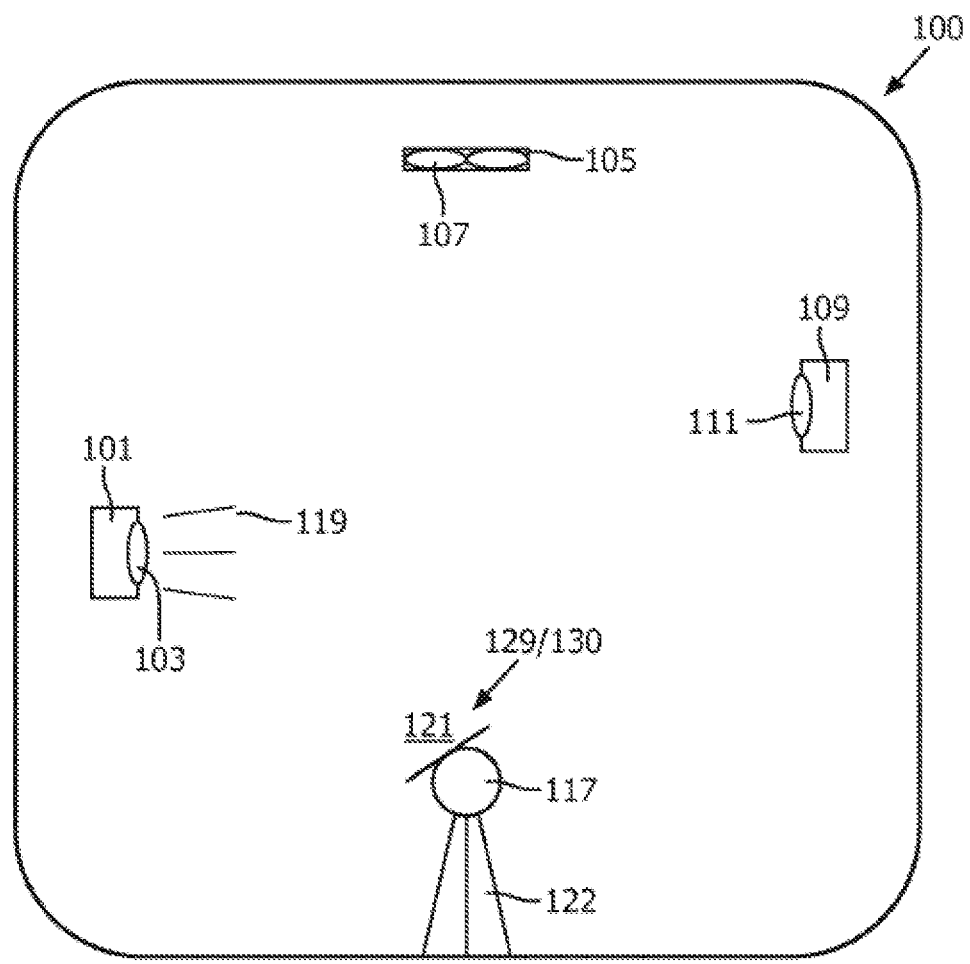
FIG. 1B is a sectional view of the lighting environment taken along A-A of FIG. 1A, in accordance with an embodiment.

Referring to FIG. 1A, in one embodiment, a top perspective view schematic representation of a lighting environment 100 is shown. FIG. 1B is a sectional view of the lighting environment 100 taken along A-A of FIG. 1A. The lighting environment 100 includes a lighting system with one or more lighting units 101, 105, 109, and 113, each of which includes one or more light sources 103, 107, 111 and 115, respectively. The lighting environment 100 can be, for example, any entertainment event complex, concert venue, and/or sporting arena including a soccer/football pitch or swimming pool, which can include a lighting system where a light plan may be required. The lighting environment 100 can also include road lighting solutions where interval distances and heights may be known. The position and/or orientation of each of the one or more light sources 103, 107, 111 and 115 within the particular lighting environment 100 can be known based on a light plan (as should be appreciated and understood by those of skill in the art in conjunction with a review of this disclosure).

In order to determine the lux value contribution of the one or more light sources 103, 107, 111 and 115 of the one or more respective lighting units 101, 105, 109, and 113 at a predetermined measurement point 121 within the lighting environment 100, a light sensor 129 (which includes a matrix of light sub-sensors 130) of sensor unit 117 (e.g., a digital camera) is placed on a tripod 122 at the predetermined measurement point 121 (on a known grid, for example) and aimed toward one of the lighting units 101. As shown in FIGS. 1A-1B, lighting unit 101 includes a plurality of individual light sources 103 that are turned on and emanating light 119. The light sources 107, 111 and 115 of the other respective lighting units 105, 109, and 113 are shown turned off and not emanating any light for the purpose of isolating measurement of light emanating from light sources 103. Separate measurements can be made of light sources 107, 111 and 115 in a similar manner. The measurement point 121 can be defined or "predetermined" based on a GPS reading, or manually via the use of measurement tape, taking into consideration the known values of the light plan (as should be appreciated and understood by those of skill in the art in conjunction with a review of this disclosure).

Figure 2:
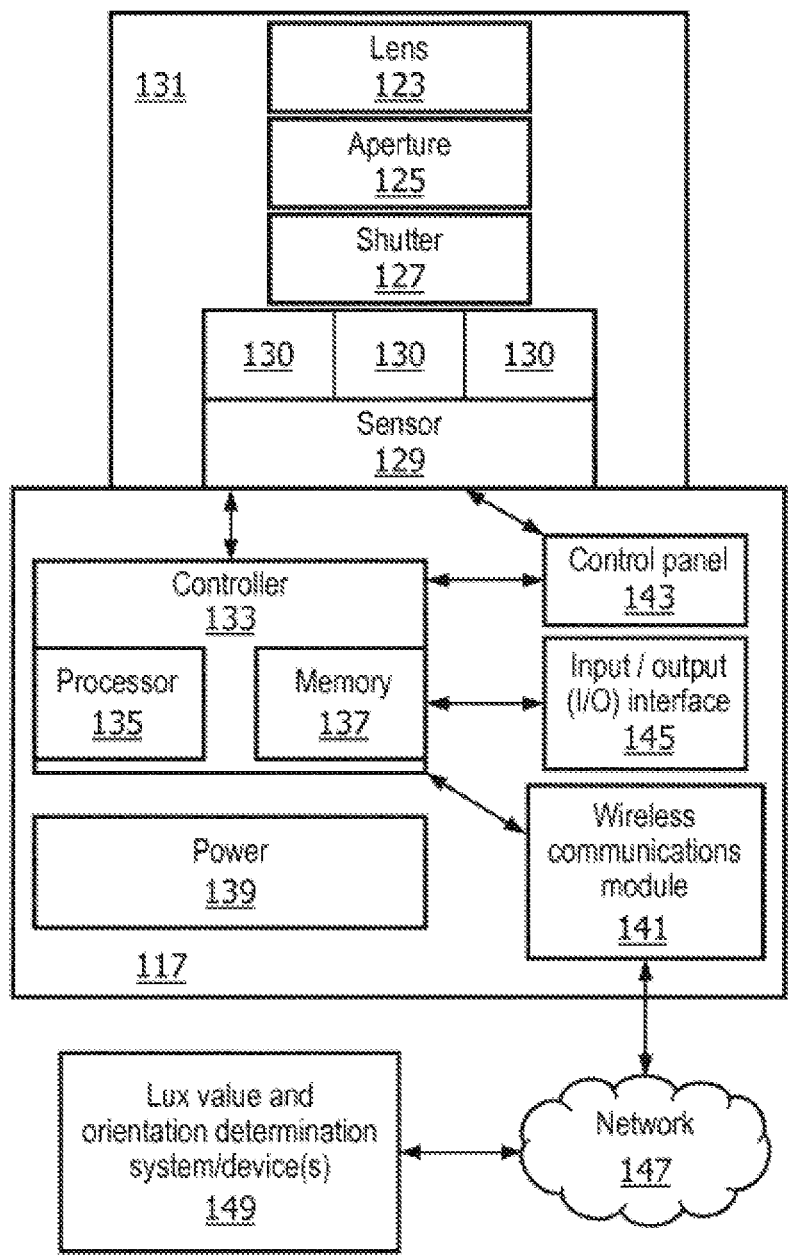
FIG. 2 is a schematic representation of the basic components of a sensor unit, in accordance with an embodiment.

Referring to FIG. 2, a schematic representation of the basic components of sensor unit 117 is provided. As described above, in a most advantageous embodiment, sensor unit 117 is a digital camera configured or programmed to assist with the determination of the lux value contribution of the one or more light sources 103, 107, 111 and 115 of the one or more respective lighting units 101, 105, 109, and 113 at the predetermined measurement point 121 within the lighting environment 100.

According to an embodiment, sensor unit 117 can include a digital image capture module 131 including lens 123, aperture 125, shutter 127, and a light sensor 129 with a matrix of light sub-sensors 130. The digital image capture module is configured or programmed to capture a digital image (as should be appreciated and understood by those of skill in the art in conjunction with a review of this disclosure) including pixels with particular pixel values associated with various light sources that are the subject of such digital photographs, and which can be converted to actual lux values as described further below. Controller 133 is configured or programmed to output one or more signals to the digital image capture module 131 to focus the lens 123, increase or decrease the exposure (by, for example, controlling the aperture 125 setting to vary the size of the lens 123 opening, controlling the shutter 127 speed in order to control the amount of light entering the sensor unit 117, and controlling the ISO sensitivity setting to adjust the amount of light the light sensor 129 detects), and taking/capturing a digital photograph based on particular settings. For example, controller 133 may be programmed or configured to generate a control signal for each of the components of the digital image capture module 131 independently or collectively as may be required for the functions and methods described herein.

According to another aspect, controller 133 can be or have, for example, a processor 135 programmed using software to perform various functions and methods discussed herein, and can be utilized in combination with a memory 137. Memory 137 can be removable or fixed and can store data, including one or more digital image capture module 131 commands or software programs for execution by processor 135, as well as various types of data. These various types of data can include, but are not limited to, digital images captured by the digital image capture module 131 including pixels with particular pixel values associated with various light sources that are the subject of such digital images. Certain multi-spectral data can also consist of position or "geo logging" to associate the measurements with the conditions in which it is measured. The memory 137 may be a non-transitory computer readable storage medium that includes a set of instructions that are executable by processor 135, and which cause the system to execute one or more of the steps of the functions and methods described herein.

Sensor unit 117 also includes a source of power 139, most typically DC power, although other power sources are possible including AC power sources, solar-based power sources, or mechanical-based power sources, among others. The power source may be in operable communication with a power source converter that converts power received from an external power source to a form that is usable by the sensor unit 117. In order to provide power to the various components of sensor unit 117, it can also include an AC/DC converter (e.g., rectifying circuit) that receives AC power from an external AC power source and converts it into direct current for purposes of powering the sensor unit's 117 components. Additionally, sensor unit 117 can include an energy storage device, such as a rechargeable battery or capacitor, that is recharged via a connection to the AC/DC converter and can provide power to controller 133.

In addition, the various components of the sensor unit 117 are connected to one another as shown by the double-headed arrows, each of which represents the ability of each of these components to transmit/receive information, data and/or commands (control signals) from each of the other respective components or external components/devices as may be appropriate to carry out the functions and methods described herein (as should be appreciated and understood by those of skill in the art in conjunction with a review of this disclosure). For example, certain commands and/or information can be entered directly into and sent from the sensor unit 117 through the control panel 143. Control panel 143 can be a key board, touch pad, or other input receivable elements configured to receive and transmit input commands/information to the sensor unit 117.

The sensor unit 117 may also communicate with one or more lux value and orientation determination system(s)/device(s) (or module(s)) 149, each of which can be any processor-based device that is remote from (but can also be a part of) sensor unit 117 and is capable of facilitating a user's access and interaction with the sensor unit 117 (including one or more devices that enable a user to interact with sensor unit 117 and any devices (e.g., network card, modem, etc.) that enable sensor unit 117 to communicate with one or more other remote computing devices). Such communication/data transmission/commands can occur via input/output (I/O) interface(s) 145. Still yet, sensor unit 117 can communicate with one or more networks 147, such as a local area network (LAN), a general wide area network (WAN), and/or a public network (e.g., the Internet) via wireless communications module 141 or other network adapter. The wireless communications module 141 can be, for example, Wi-Fi, Bluetooth, IR, radio, or near field communication that is positioned in communication with controller 133 or, alternatively, controller 133 can be integrated with the wireless communications module 141. The lux value and orientation determination system(s)/device(s) 149 can be used to input commands to the sensor unit, such as a certain exposure setting, and can be used to determine the pixel values and the lux values (relative and actual) based on the digital image data taken by, transmitted and received from the sensor unit 117, as discussed further below.

According to an embodiment, the sensor unit 117 does not necessarily require customized components. Although, higher quality components and higher resolution capacity will ease calibration procedures (as may be necessary) and accuracy (e.g., high dynamic range of the sensor 129 for higher light resolution measurements, high resolution for better individual light source 103 isolation, low deformation of the lens 123 for better correction, etc.). A dual camera system could be advantageous, however, current measurement procedures do not require all around (i.e. also downwards) measurements. A single digital camera solution, for example, can be appropriate for direct light measurement where bounced/reflected or other ambient "noise" light will not be considered. According to an embodiment, this can be done, for example, by masking the image around the floodlights and therefore excluding the ambient light completely (as should be appreciated and understood by a person of ordinary skill in the art in conjunction with a review of this disclosure). For example, a computer program could be run on digital image data (from a digital image taken by a sensor unit 117 of light sources in a lighting environment), and could contain instructions to not consider any pixel values under a certain value (e.g., 100) to cut out the ambient light (based on the specifics of the lighting environment). The light plan can also (separately or additionally) be used as a base for probability of the light source position in the captured image(s).

As described herein, the sensor unit 117 can be used to determine the relative and actual lux value contribution and orientation of each of at least a majority of light sources (e.g., 103) in a lighting unit (e.g., 101) at at least one predetermined measurement point 121 within a lighting environment 100. Advantages of embodiments (as briefly detailed above and shown in FIGS. 1A-1B and 2, and described below and shown in FIGS. 3, 4A-4B and 5) are illustrated by the following Exemplary Methods and Uses description. However, the particular components, uses, functionalities and amounts thereof recited in this description, as well as other conditions and details, are to be interpreted to apply broadly in the art and should not be construed to unduly restrict or limit the invention in any way.

Exemplary Methods and Uses

Figure 3:
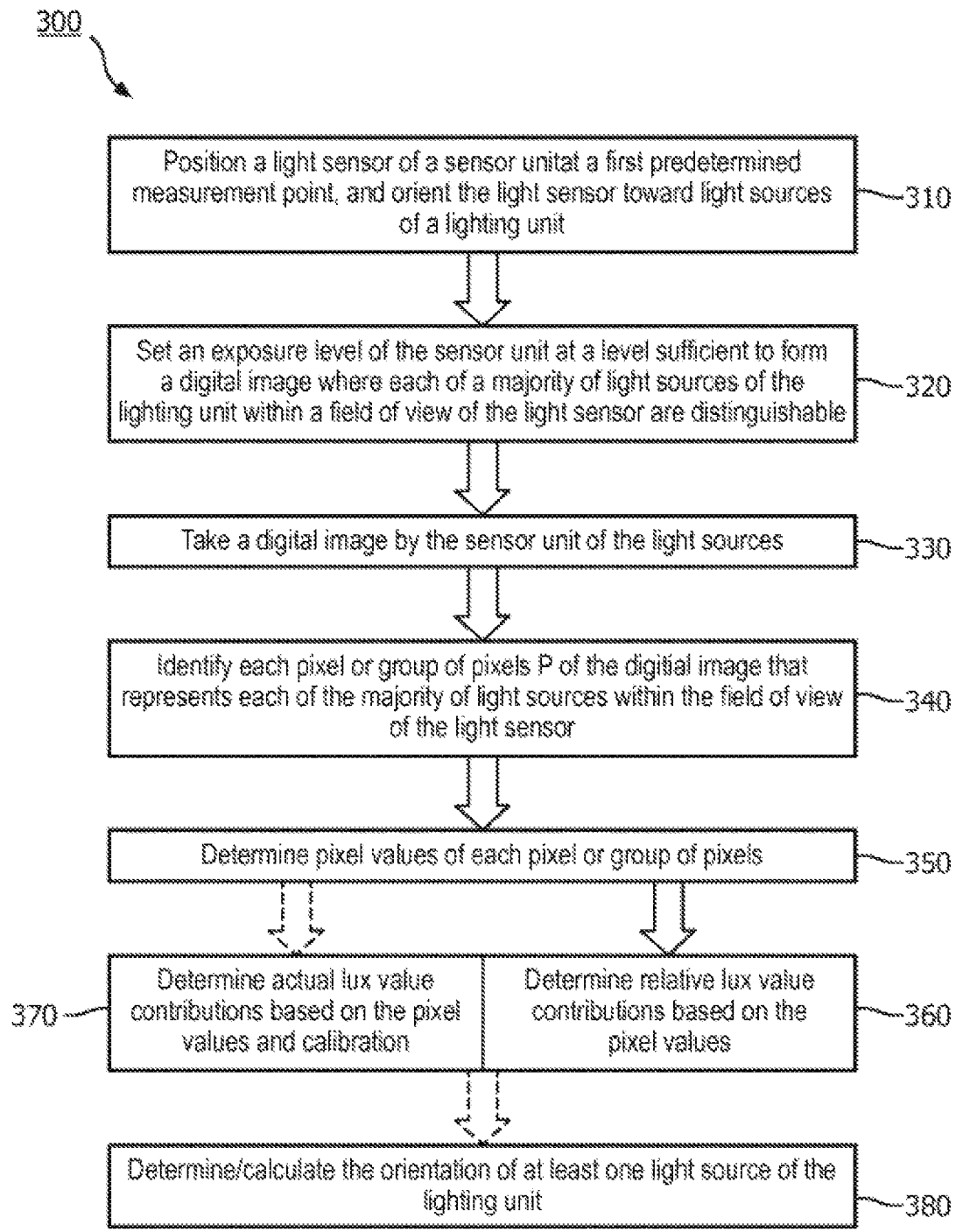
FIG. 3 is a flow chart of a method, in accordance with an embodiment.

Referring to FIG. 3, in one embodiment, a flow chart illustrating a method 300 for determining the relative and actual lux value contribution and orientation of each of at least a majority of light sources (e.g., 103) of a lighting unit (e.g., 101) at a first predetermined measurement point 121 within a lighting environment 100 is provided.

In step 310, a light sensor 129 including a matrix of light sub-sensors 130 of a sensor unit 117 is positioned at the first predetermined measurement point 121 within the lighting environment 100 and oriented toward the light sources of the lighting unit. According to an alternative embodiment, the light sensor 129 can be part of a 360 degree digital camera, and such a camera/sensor can be structured, configured and/or programmed to digitally capture a scene (and, thus, all lighting units shown in FIG. 1A, for example), in all directions from the camera position's point of view. As should be appreciated and understood by a person of skill in the art in conjunction with a review of this disclosure, such a digital camera can have an impact on how or whether the camera should be "aimed" or "oriented." One can imagine, for example, that the orientation of the sensor 129 can become less important where all light sources in all lighting units (in FIG. 1A) are captured and, therefore, in principle, aiming may not be necessary (given that with image analysis and combining the same with the light plan the orientation can be reconstructed/estimated). As such, a measurement with a specific 360 degree camera is different from a limited field of view camera where it can be more important how such a camera is aimed, unless multiple images are capture and "stitched" to create a 360 image. Further, if, presumably, all light sources in all lighting units (in FIG. 1A), for example, can be captured, then all computations as described herein can be performed based on this 360 degree field of view instead of a more limiting field of view of a traditional digital camera.

At step 320 of the method, an exposure level of the sensor unit is set at a level sufficient to form a digital image where each of a majority of light sources 103 within a field of view of the light sensor 129 are distinguishable from other respective adjacent light sources of the lighting unit 101. The goal of this step is to lower the exposure level to a point where the light sources 103 of the lighting unit 101 do not blend together (i.e., where each individual light source 103 can be distinguished from other light sources of the lighting unit 101). Another goal of this step is to not "overshoot" the current range, assuring the peak observed pixel/lux value is not out of the dynamic range of the sensor. This is done by proper settings of aperture/iso values, as should be understood by a person of ordinary skill in the art in conjunction with a review of this disclosure. This can be particularly advantageous for actual lux measurements (as discussed further below), and may be a bit less important for the relative lux value measurement. Each set up may be different, so a specific quantifiable setting may not be appropriate for every specific measurement instance and/or lighting environment.

Figure 4A:
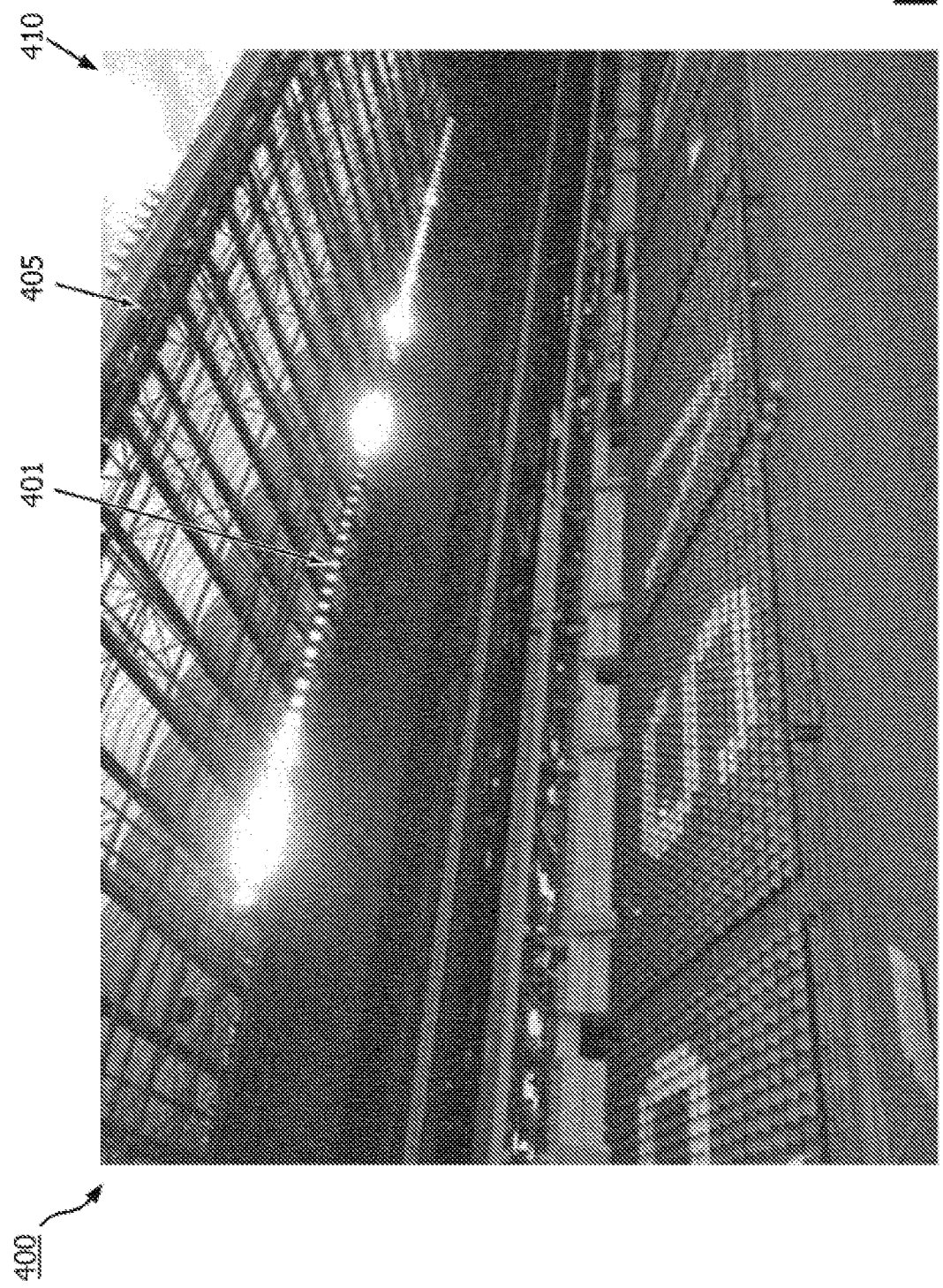
FIG. 4A is a digital image of a lighting environment, in accordance with an embodiment.

For example, as shown in FIG. 4A, a digital image 410 of lighting units 401 and 405 within lighting environment 400 is provided. This picture was taken by a digital camera at a position and orientation in the lighting environment 400 similar to the position and orientation of the sensor unit 117 as shown in FIGS. 1A and 1B. The lighting environment 400 is a football/soccer pitch and the lighting units 401, 405 each includes a plurality of flood lights. However, the relative exposure level setting of the digital camera when it took the picture shown in FIG. 4A is too high, as many of the light sources are indistinguishable from and blend together with other adjacent light sources and are out of range to determine the actual lux values if so desired.

Figure 4B:
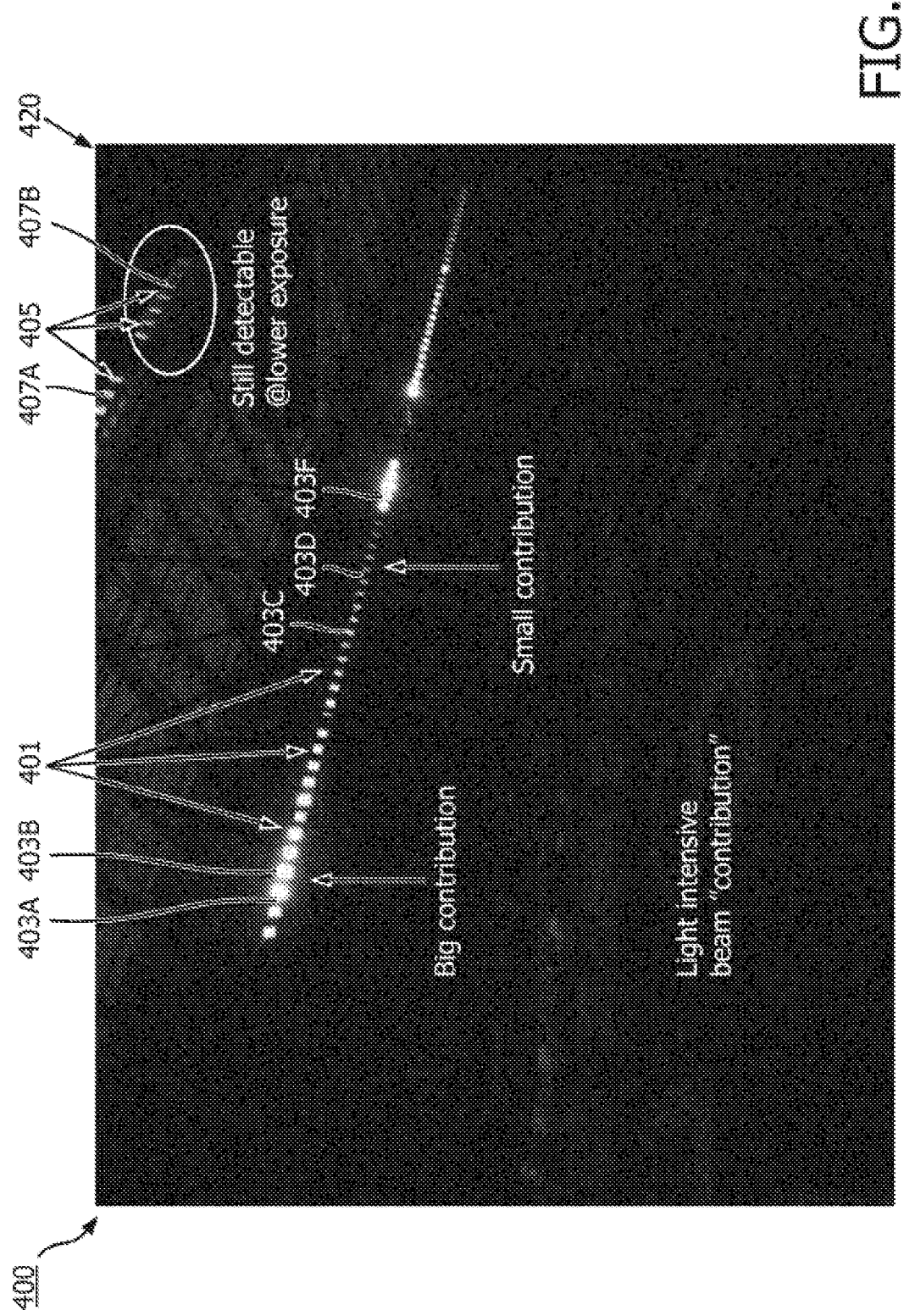
FIG. 4B is a digital image of the lighting environment shown in FIG. 4A at a lower exposure, in accordance with an embodiment.

Turning to FIG. 4B, a digital image 420 of lighting units 401 and 405 within lighting environment 400 taken at the same position and orientation by the same digital camera as the digital image shown in FIG. 4A is provided. Digital image 410 and digital image 420 were shot in immediate sequence. However, the digital camera was set at a relatively lower exposure level for the digital image 420 in FIG. 4B as compared to the digital image 410 in FIG. 4A. The lower exposure decreases the bloom effect (leakage), and therefore increases localization accuracy. This relatively lower exposure level shows individual light sources 203A, 203B, 203C, 203D and 203F of lighting unit 401 and 407A and 407B of lighting unit 405, many of which were indistinguishable from adjacent light sources in the digital image of FIG. 4A. Accordingly, consecutive digital images can be taken at the same camera position and orientation within a lighting environment at different exposure levels to determine which exposure level (or levels) yields a sufficient digital image (i.e., showing light sources that are distinguishable for respective adjacent light sources) for each particular measurement instance and/or lighting environment.

Turning to step 330, a digital image is taken by the sensor unit 117 of the light sources of the lighting unit within the field of view of the light sensor 129. As discussed above, example digital images 410 and 420 taken by the same camera at the same position and orientation, but at different relative exposure levels, are shown in FIGS. 4A-4B. According to an embodiment, the digital image and related digital image data can be saved and/or analyzed by the controller 133 (and related processor 135 and memory 137 components) and/or can be transmitted to lux value and orientation determination system(s) device(s) 149 for analysis. Such analysis can include the performance of the following identification (step 340) and determination steps (steps 350, 360, 370 and 380).

Figure 5:
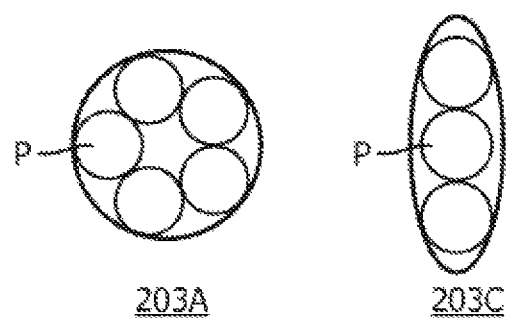
FIG. 5 is a schematic representation of pixels representing particular light sources shown in FIG. 4B, in accordance with an embodiment.

At step 340, each pixel or group of pixels P of the digital image that represents each light source of the majority of light sources within the field of view of the light sensor 129 is identified. This step can be performed by processor 135 and/or lux value and orientation determination system/device 149 (as should be appreciated and understood by those of skill in the art (such as computer vision) in conjunction with a review of this disclosure). Turning to FIG. 5, according to an embodiment, a schematic representation of the pixels P representing each light source 203A and 203C are shown. As should be understood by those of skill in the art, a pixel is the smallest measurable unit of a digital image.

At step 350, pixel values of each pixel or group of pixels of the digital image that represents each light source of the majority of light sources within the field of view of the light sensor 129 are determined. This step can be performed by processor 135 and/or lux value and orientation determination system/device 149 (as should be appreciated and understood by those of skill in the art in conjunction with a review of this disclosure). In an advantageous embodiment, a calibration step can optionally be conducted prior to step 340 pursuant to computer vision principles (as should be appreciated and understood by those of skill in the art in conjunction with a review of this disclosure) to take into account and compensate for any angle distortions of the lens 123 in order to obtain a more accurate pixel value reading. The end goal of such a calibration is to determine what every pixel coordinate in 2D of a digital image actually represents in the real world by compensating for any barrel effect or other distortion of a digital image (per use of a checkerboard or reference board and other camera calibration procedures as should be appreciated and understood by a person of ordinary skill in the art in conjunction with a review of this disclosure).

As should be understood by those of skill in the art, pixel values range from 0 to 255 (where 0=black, 255=white, and between values are different shades of gray) and correspond and are proportional to lux values of light at a particular point (e.g., the point of where the light strikes the sensor 129), and the digital value range can be 10 or 24 bit grey values, etc. Lux values may not increase linearly with an increase in pixel values, but, in general, an increase in or relatively high pixel values can represent an increase in or relatively high lux values. As such, the sensor unit 117 can act as a lux meter with a segmented sensor 130, with each pixel representing an incoming angle of light.

At step 360, relative lux value contributions of light sources in a digital image at a particular exposure level (pixel values can vary based on exposure level, however, light has the same intensity/lux value at a particular point), exposure/iso value pair or aperture/gain value pair etc., and can be determined/calculated based on a comparison of pixel values of each light source, without knowing the actual lux values the respective pixel values represent. As should be appreciated and understood by a person of skill in the art in conjunction with a review of this disclosure and certain photography/cinematography considerations for exposure and gain, a camera has balanced settings of exposure (aperture) and gain (ISO). The first is physical, while the latter is electronic. Depending on what a user wants to capture, a single value or value pair of this group can be chosen. A goal, as discussed throughout this disclosure, is to obtain a digital image where each of a majority of light sources within a field of view of a light sensor are distinguishable from other respective adjacent light sources of the lighting unit. This can be obtained by adjusting these values and obtaining a proper balance of these values. If a light source's contribution is represented by more than one pixel, the pixel values of the multiple representative pixels can be averaged to determine a single pixel value (and, thus, relative or actual lux value) for that particular light source at the predetermined position. For example, the average pixel value of light source 203A can be 200 and the average pixel value of light source 203C can be 50. Since light source 203A has a larger average pixel value, light source 203C also has a relatively larger lux value (which can be confirmed, at least in this instance, by pure observation of FIG. 2B).

According to an optional step 370, actual lux value contributions of light sources in a digital image at a particular exposure level are determined/calculated. Such a calculation is based on a comparison/cross reference of the pixel value with a pixel value to lux value calibration table, as should be appreciated and understood by a person of ordinary skill in the art in conjunction of a review of this disclosure. For example, according to Table 1 below, if the average pixel value of light source 203A is 200 and the average pixel value of light source 203C is 50 (as discussed above) at the predetermined position at exposure level X, then the actual lux value of light source 203A is 1000 and the lux value of light source 203C is 100.

TABLE 1

| PIXEL VALUE at EXPOSURE LEVEL X | LUX VALUE |
|---|---|
| 200 | 1000 |
| 100 | 500 |
| 50 | 100 |

Table 1 is for illustrative purposes only. As should be appreciated and understood by a person of skill in the art in conjunction with a review of this disclosure, a variable GAIN Y can replace EXPOSURE X above, or EXPOSURE X/GAIN Y PAIR can replace EXPOSURE X above. Although, the exposure/gain values span a 2D space, most points in that space can be sub-optimal. It can be possible that this space can be reduced significantly and in the extreme each exposure value may have an optimal gain value, so that the collective of the exposure/gain pair will cover the whole dynamic range of lighting.

According to an optional step 380, the orientation of at least one light source 103 of the lighting unit 101 at a particular exposure level is determined/calculated. Such a calculation is determined based on general sampling theory, as should be appreciated and understood by a person of ordinary skill in the art in conjunction of a review of this disclosure. A light source's orientation estimation increases with contribution measurements from more than one position, Ideally, the collective of measurement positions can yield an accurate orientation estimation. (Also sometimes called "pose", as should be appreciated and understood by a person of ordinary skill in the art in conjunction with a review of this disclosure.).

In brief, consider the digital image 420 of FIG. 4B as the first image in an orientation calculation for light sources 203A and 203C. As the sensor unit 117 is moved to the right (from the sensor unit user's perspective) to a second position, for example, at two meter intervals, the pixel value of light source 203A associated with a digital image at the second position can decrease (indicating orientation of light source 203A is positioned more toward the left from the point of view of the sensor unit 117), and the pixel value of light source 203C can increase (indicating orientation of light source 203C positioned more toward the right from the point of view of the sensor unit 117). The sensor unit 117 can methodically be moved in other directions at particular intervals to determine/validate the exact orientation of the light sources, where the highest/peak relative pixel value of each individual light source can be an indication of such light source's orientation. Practically, the orientation of the angular light profile can be associated with the light source orientation.

The wider the beam width, the sample reading positions (where digital images are taken to develop a light intensity profile of a particular light source) can be wider apart as compared to light beam widths that are narrower. Additionally, light fitting models can be used to calculate pixel values for a particular light source in between the positions of the sample readings (positions where digital images were actually taken). As such, when the collective of light measurement of multiple points is considered, it is possible to determine the actual light orientation. Its accuracy depends on the measurement positions "sampling", but fitting the light distribution model (e.g. IES profile) on the measurement data of a single light source at different positions can result in a fairly accurate orientation determination.

According to an embodiment, using a light plan can contribute significantly to accuracy of the measurements and "determination" steps described herein, since the exact collective position of the light source installation can be derived. This can be an advantage over the traditional sensors, as described in the Background section. In brief, since the light plan can define one or both of the position and orientation of every light source in a lighting environment (and, as such, essentially prescribes how the light sources should contribute to particular points in the lighting environment), the collective of positions of the light sources can function as a signature for the orientation of the sensor unit 117. Relative standard technique can be used to fit the light plan data with the camera image, as should be appreciated and understood by a person of skill in the art in conjunction with a review of this disclosure. Once the orientation of the sensor is determined very accurately, a weighted measurement mask can be used to define the measurement direction that is comparable with the conventional light sensors (single sensor with 180 fov and cosine fall off). One step further could be localization of the measurement position, which in turn enables measurement sequence navigation and automatic annotated geo logging. This can be especially useful for certain current light measurement protocols where a grid of measurement points is manually set out and measurement results are typed in in a spreadsheet. Additionally, a weighted sum of an image region (field of view) can produce the same measurement results when the region and weights are chosen correctly, as should be appreciated and understood by those of skill in the art in conjunction with a review of this disclosure. This weighted region can be considered a mask and shifted over the image and effectively control the direction the measurement is being performed. This makes the method of an embodiment very flexible for producing validation reports for different standards with a single measurement "run", since the calculations could be a post-process.

More advanced features will be enabled when a light plan is fully utilized. For example, the light plan values can be used in a comparison of the contribution and orientation readings/values taken and determined by the devices and systems described herein, and validation/non-uniformity determinations can be made. These validation/non-uniformity determinations might explain why the values (e.g. non-uniformity) of the practical solution differ from the estimated values of the theoretical light plan. This is likely because of errors in the practical orientations of the light sources. Alternatively, the unexpected non-uniformity could be due to a spread in light output of individual light sources. This is an aspect of what an embodiment of the disclosed method can provide, since it can be directed to measuring light contributions of every individual light source in a field of view of a sensor unit. Additionally, the light plan can contribute to estimation values since it should indirectly and accurately define the distances of light sources and therefore can compensate for light intensity fall off of light sources that are comparatively farther away that others in a particular field of view of a sensor (i.e., the light intensity measurement of a light source can be relatively low based on distance from the measurement point and not based on orientation).

As noted herein, the measurements (digital images) by the sensor unit 117 can be taken to validate that a particular lighting system meets a particular standard. If a particular light or group of lights in a particular lighting unit is off its required orientation and is not contributing to a particular measurement point as may be dictated, this issue can be determined (based on the measurements by an embodiment of the sensor unit 117) and addressed. Further, a measurement procedure could involve a system with a sensor unit 117 mounted on a car, for example, to determine uniformity, glare, and faulty installation of lighting units in certain districts. Having this installed on, e.g., public transportation vehicles like passenger busses could provide a continuous service of guaranteed quality of light in a city.

According to an additional aspect, light contribution measurements with sensor unit 117 can be performed during the day in an outdoor stadium. Although day time measurement can be performed, it is recommended to limit such measurement only to direct light measurement. The ambient light might contribute too much to the bounced light (e.g. light bounced from the field for vertical light measurements), depending on the particulars of the lighting environment. However, day time light contribution measurements can still be used for preliminary analysis of individual contribution of floodlights and light uniformity (and therefore shorten the whole installation iteration loop).

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for determining lux value contribution of each of at least a majority of light sources of a lighting unit at a first predetermined measurement point within a lighting environment, the method comprising the steps of:
    positioning a light sensor of a sensor unit comprising a matrix of light sub-sensors at the first measurement point, and orienting the light sensor toward the light sources of the lighting unit;
    setting an exposure level or a gain level of the sensor unit at a level sufficient to form a digital image wherein each of the majority of light sources within a field of view of the light sensor are distinguishable from other respective adjacent light sources of the lighting unit;
    taking a digital image by the sensor unit of the light sources of the lighting unit within the field of view of the light sensor;
    identifying each pixel or group of pixels of the digital image that represents each light source of the majority of light sources within the field of view of the light sensor;
    determining pixel values of each pixel or group of pixels of the digital image that represents each light source of the majority of light sources within the field of view of the light sensor, wherein the determining comprises determining the relative lux values of each pixel or group of pixels of the digital image that represents each light source of the majority of light sources within the field of view of the light sensor, by comparing the pixel value of each pixel or group of pixels of the digital image that represents each light source;
    providing the light sources of the lighting unit with a predefined orientation value according to a light plan; and
    calculating an actual orientation value of a first light source of the majority of light sources within the field of view, the calculation comprising the use of a plurality of contribution measurements from more than one position, the plurality of contribution measurements being measured by taking a plurality of digital images of the first light source with the sensor unit along multiple respective points of a predetermined path.

2. The method of claim 1, wherein the step of determining further comprises the step of determining the actual lux values of each pixel or group of pixels of the digital image that represent each light source of the majority of light sources within the field of view of the light sensor.

3. The method of claim 2, wherein the step of determining the actual lux values comprises cross referencing the pixel values of each pixel or group of pixels of the digital image that represents each light source of the majority of light sources within the field of view of the light sensor with a pixel value to lux value calibration table.

4. The method of claim 1, further comprising the step of comparing the determined orientation value of the first light source with the predefined orientation value according to the light plan, and determining any differences between the determined orientation value and the predefined orientation value.

5. The method of claim 1, wherein the step of calculating the orientation further comprising the step of developing a light intensity profile of the first light source by:
    identifying each pixel or group of pixels of the digital image that represents the first light source; and
    determining pixel values of each pixel or group of pixels of the digital image that represents the light source.

6. The method of claim 1, wherein the sensor unit is a digital camera.

* * * * *